United States Patent
Wyke et al.

(10) Patent No.: US 7,334,215 B2
(45) Date of Patent: Feb. 19, 2008

(54) MANAGER FOR SOFTWARE CONTROLS IN AN OPERATING ENVIRONMENT

(75) Inventors: Kenneth C. Wyke, Culpeper, VA (US); John W. Moore, Falls Church, VA (US); Archie Spivey, Myrtle Beach, SC (US)

(73) Assignee: Lockheed Martin Corporation, Bethesda, MD (US)

( * ) Notice: Subject to any disclaimer, the term of this patent is extended or adjusted under 35 U.S.C. 154(b) by 866 days.

(21) Appl. No.: 10/321,425

(22) Filed: Dec. 18, 2002

(65) Prior Publication Data
US 2003/0120698 A1 Jun. 26, 2003

Related U.S. Application Data

(60) Provisional application No. 60/341,862, filed on Dec. 21, 2001.

(51) Int. Cl.
*G06F 9/44* (2006.01)
(52) U.S. Cl. .................. 717/107; 717/100; 717/106; 717/108; 719/313; 719/315
(58) Field of Classification Search ................ 717/100, 717/106–108, 121, 156–178; 709/208–211; 719/313–317, 331–332; 715/700, 762, 764
See application file for complete search history.

(56) References Cited

U.S. PATENT DOCUMENTS

| | | | |
|---|---|---|---|
| 5,453,933 A | | 9/1995 | Wright et al. |
| 5,475,817 A | * | 12/1995 | Waldo et al. ................ 719/316 |
| 5,790,789 A | * | 8/1998 | Suarez ........................ 709/202 |
| 5,847,955 A | | 12/1998 | Mitchell et al. |
| 6,009,406 A | | 12/1999 | Nick |
| 6,198,980 B1 | | 3/2001 | Costanza |
| 6,381,742 B2 | * | 4/2002 | Forbes et al. ................ 717/176 |

(Continued)

FOREIGN PATENT DOCUMENTS

EP 0520926 A2 12/1992

OTHER PUBLICATIONS

Onion "ActiveX Control Fundamentals" Jan. 1999 C++ Report, downloaded from http://www.pluralsight.com/articlecontent/ccprep0199.htm on Sep. 26, 2006.*
Nandurkar "CodeGuru: Listing All Registered ActiveX Controls" dated Mar. 6, 2001, downloaded from http://www.codeguru.com/cpp/com-tech/activex/controls/print.php/c5527 on Sep. 26, 2006.*

(Continued)

*Primary Examiner*—Meng-Al T. An
*Assistant Examiner*—Jason Mitchell
(74) *Attorney, Agent, or Firm*—Marsh Fischmann & Breyfogle LLP

(57) ABSTRACT

A software control manager for identifying, authorizing, and coordinating software controls within an operating environment is disclosed. The operating environment may reside on a computing platform. The controls provide functionality to the operating environment and are used to retrieve or gather information. The manager coordinates the information to the controls. The manager also registers the controls as the controls are placed within the operating environment. Registered controls are listed in a control list within the manager. The manager may perform a security process in registering the controls. The manager also provides information on the operating environment and other controls to controls added to the operating environment. The manager facilitates the other controls retrieving information and associating the information with existing data on the computing platform.

12 Claims, 6 Drawing Sheets

U.S. PATENT DOCUMENTS

| | | | |
|---|---|---|---|
| 6,407,761 B1 * | 6/2002 | Ching et al. | 715/835 |
| 6,438,744 B2 * | 8/2002 | Toutonghi et al. | 717/137 |
| 6,564,377 B1 * | 5/2003 | Jayasimha et al. | 717/174 |
| 6,609,158 B1 * | 8/2003 | Nevarez et al. | 719/316 |
| 6,704,737 B1 * | 3/2004 | Nixon et al. | 707/101 |
| 6,883,168 B1 * | 4/2005 | James et al. | 717/178 |
| 2002/0111814 A1 * | 8/2002 | Barnett et al. | 705/1 |

OTHER PUBLICATIONS

"AR Form Extender ActiveX control 1.14" released on Dec. 25, 2000, documentation downloaded from http://www.sevillaonline.com/ActiveX/ARFormExtender.htm on Apr. 20, 2007.*

Supplementary European Search Report. Application No. EP02801211. Aug. 3, 2000.

Linus Torvalds et al. Excerpt from the source of Linux kernel 2.4.1. Internet Citation. Jan. 30, 2001.

Wikipedia: Twip definition. Internet Citation. Aug. 3, 2007.

* cited by examiner

MANAGER FOR SOFTWARE CONTROLS IN AN OPERATING ENVIRONMENT

CROSS REFERENCE TO RELATED APPLICATIONS

This application claims benefit of U.S. Provisional Patent Application No. 60/341,862 entitled "Electronic Interactive Communication System and the Method Therefor," filed Dec. 21, 2001, which is hereby incorporated by reference.

BACKGROUND OF THE INVENTION

1. Field of the Invention

The present invention relates to an electronic interactive communication system, and, more particularly, the invention relates to a system and method for managing software controls with a manager within an operating environment.

2. Discussion of the Related Art

The number of computing platforms has markedly increased in recent years. Palm-size and/or portable computing devices have become commonplace. Further, the number of different versions of a particular platform has increased as well, each with specific operating systems. A variety of software programs also has been created to execute on the computing platforms. Conventional computing devices can pre-store information and program code in memory or receive the information from another device to enable executing the programs. With the multitude of computing platforms and operating systems, programs and information should be conceived with the ability to execute in many operating environments.

A software control may enable or launch different programs operating on different platforms. A software control may be a program module that enhances the functionality of an existing program. A control may act as a user interface function that allows the user to manipulate information stored in the memory of a computing platform. Controls may add functionality by calling existing components to integrate and appear as normal parts of the program. In general, however, these controls are dormant until activated and may not reside passively within a computing environment. This drawback may reduce the effectiveness of the controls and restrict the ability of the controls to interact within the software environment, and with other programs and controls. Further, conventional controls may not access the properties and methods of other controls without causing that control to become active.

Controls may be desirable on computing platforms that are portable devices, as discussed above. The controls may improve the functionality of the portable device and provide the user with additional information over programs stored on the device. Problems, however, may occur if too many controls are active at the same time as memory resources are claimed by the controls at the expense of the programs. Further, the controls may not be able to interact with each other, or the operating system of the device. Thus, the controls lose their ability to enhance the functionality of the computing platform

SUMMARY OF THE INVENTION

Accordingly, the disclosed embodiments are directed to a system, device, or method that enables a software control manager for software controls within an operating environment.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an operating environment for a computing platform having at least one control is disclosed. The computing platform includes a processor and a memory. The operating environment includes a first control to provide a function. The operating environment also includes a manager that identifies the first control and coordinates information to the first control. The function uses the information.

According to an embodiment, a method for coordinating a control within an operating environment is disclosed. The method includes querying a control list on a manager within the operating environment. The method also includes identifying a control from the control list. The method also includes retrieving information for the control. The method also includes coordinating the control with another control within the operating environment using the manager. The other control is on the control list.

According to an embodiment, a method for managing controls within an operating environment is disclosed. The operating environment facilitates data exchange. The method includes notifying a manager of the controls within the operating environment. The method also includes registering with the manager those controls recognized by the manager. The method also includes providing information to the registered controls from the manager. The method also includes facilitating communication between the controls and the operating environment via the manager.

According to an embodiment, a method for performing an action with controls within an operating environment is disclosed. The method includes receiving a command for the action at a manager within the operating environment. The manager coordinates the controls. The method also includes identifying a control method for the action. The manager initiates the control method. The method also includes identifying at least one control to execute in conjunction with the control method. The method also includes receiving information from the manager at the at least one control. The method also includes performing the action using the information with the at least one control.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide further understanding of the invention and are incorporated in and constitute a part of this specification. The accompanying drawings illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
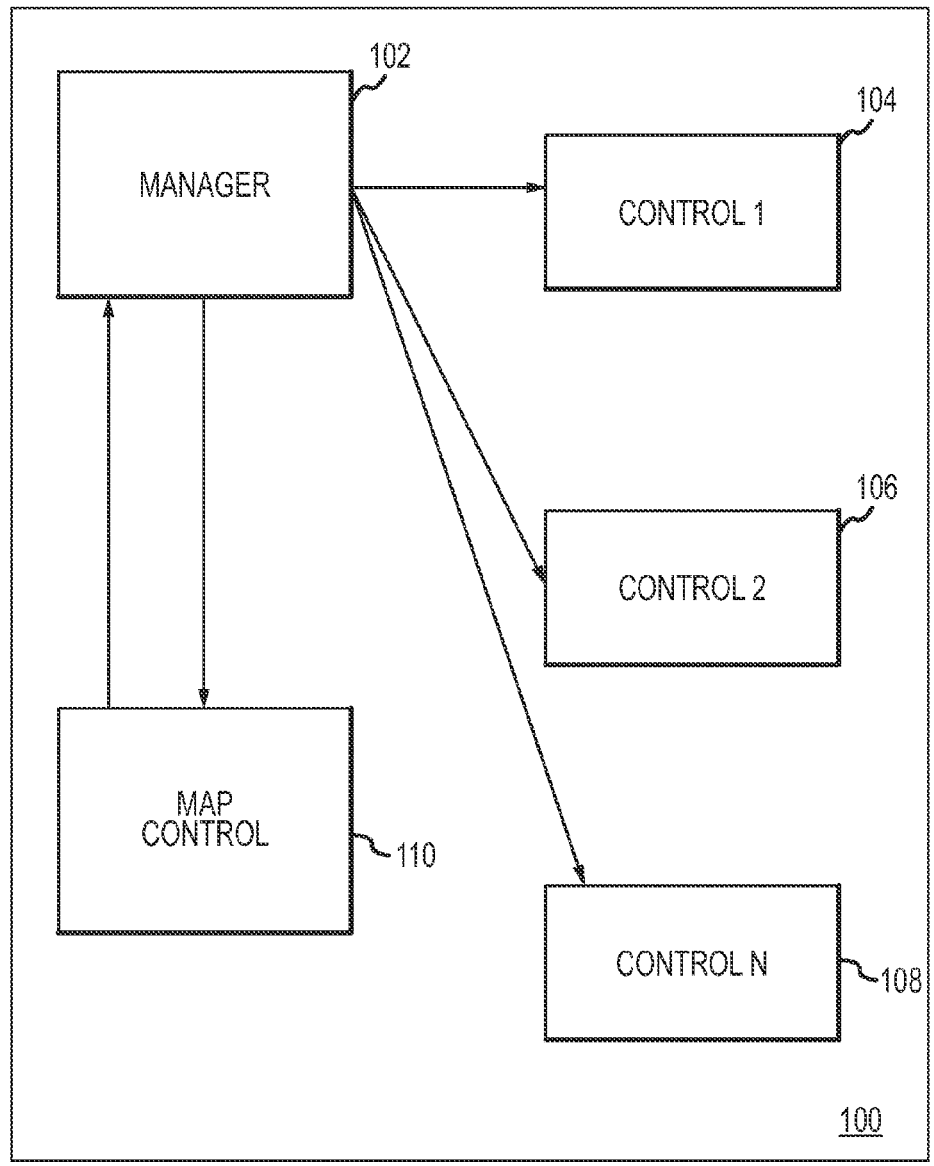
FIG. 1 depicts an operating environment having a software control manager and software controls in accordance with an embodiment of the present invention

FIG. 1 depicts an operating environment 100 having a control manager 102 and controls 104, 106, 108, and 110 in accordance with an embodiment of the present invention. Operating environment 100 may reside on any computing platform that includes a processor, memory, and the means, such as software code, to execute instructions for operations on the platform. The computing platform also may be known as a unit or device that includes any computer, such as a desktop, a portable computer, a laptop, a personal digital assistant ("PDA"), and the like. The computing platform also may be a network of computers or other data exchange devices. Preferably, operating environment 100 resides on a portable computing device, such as a handheld computer that executes programs and applications.

The portable computing device may interact with a transmitter or other information storage resource to receive information that is of interest to the programs and applications on the device. Operating environment 100 may coordinate updates and data delivery to controls, programs and applications that are executing on the computing device.

Controls 104, 106, 108, and 110 may different types of controls used to enhance programs and applications within operating environment 100. For example, if control 110 provides functionality for displaying maps on a device, then control 110 may be a map control. Further, control 104 may be a compass control, or the like. Control 104 also may be a mode control or a data control. Control 104 also may be an information control, a track data control, or a tree control. Controls 104, 106, 108, and 110 may act as user interfaces to manipulate data stored within a memory that is accessed by a software program within operating environment 100. For example, map control 110 may interact with a user to manipulate stored maps on a hand-held device. The distinctive aspects of controls 104, 106, 108, and 110 should be their functionality as opposed to their structure. Controls 104, 106, 108 and 110 provide functions to components operating within operating environment 100. Thus, controls 104, 106, 108, and 110 are not limited in their functionality provided to operating environment 100 or the programs executing thereon. Further, the number of controls is not limited to controls 104, 106, 108 and 110. Operating environment 100 may include any number of controls, and is not limited to controls 104, 106, 108, and 110.

Operating environment 100 also includes a software control manager 102. Manager 102 recognizes and coordinates with controls 104, 106, 108, and 110 within operating environment 100. Controls 104, 106, 108, and 110 receive information through manager 102 from operating environment 100. This information may be received on the device hosting operating environment 100, and from programs and applications executing within operating environment 100. Manager 102 also facilitates communication between controls 104, 106, 108, and 110, or any other control recognized by manager 102. Manager 102 may be self-executable in that it may be launched automatically within operating environment 100. Manager 102 may not require a command to activate.

Manager 102 also recognizes controls that are introduced to operating environment 100 or are enabled by programs and applications executing within operating environment 100. For example, control 108 may contact manager 102 for a designation, or name, for use within operating environment 100. Control 108 may include a string to designate the overall type of control. Manager 102 also may send a list of the controls to control 108 and their designations so that control 108 may exchange information with the other controls. Thus, within operating environment 100, controls may be aware of, and communicate with, each other.

For example, map control 110 resides within operating environment 100. Control 108 may be a compass control. Map control 110 may not need compass control 108, while compass control 108 may need map control 110 to be of any use to programs and applications within operating environment 100. If a user presses "North" on an interface provided by compass control 108, then compass control 108 would desire a map graphic to manipulate north. Subsequently, control 106 may be a macro control placed within operating environment 100. Control 106 may not be of immediate concern to map control 110, though map control 110 has been made aware of control 106 by manager 102. Manager 102 facilitates the above-disclosed relationships by receiving the initial information about controls 110, 108, and 106, and ensuring that the controls are able to exchange information with each other. Further, manager 102 confirms that compass control 108 is dependent on map control 110. The sequence of placing controls 104, 106, 108, and 110 within operating environment 100 is not a significant factor as manager 102 controls access and coordination between the controls themselves and operating environment 100. Thus, controls 104, 106, 108, and 110 may be incorporated into operating environment 100 dynamically and automatically, and without the need to become "active" to be used by resident programs and applications.

Controls 104, 106, 108, and 110 may have certain properties that provide information to manager 102. The properties may be created according to a system design, and are indicated within the controls themselves. One property may be control type. A control type may be a data string, such as "Map" or "Compass," that denotes the overall type of the control. This property allows manager 102 to identify the control against the other controls within operating environment 100. Another property may be support members. Support members may be a string that lists the other controls that the identified control may need to use, such as compass control 108 disclosed above. Manager 102 also comprises various properties that are disclosed in greater detail below.

Manager 102 also may implement a security or confirmation process for controls that are placed within operating environment 100. Manager 102 may invoke the security process, also known as "handshaking," when manager 102 identifies and registers a new control within operating environment 100. Manager 102 registers those controls that have authority and the data structure to reside within operating environment 100. If the new control does not have authority or is incompatible, then manager 102 may disable the control, place the control in a nonactive state, or delete the control from operating environment 100.

The security process may involve using a randomly generated number appended to a key initially sent to manager 102 from the added control within operating environment 100. A string may be added to the initial key and sent back to the added control from manager 102. If the key is not in the exact sequence desired by manager 102, then manager 102 may still allow the added control to be used, but may display a message box notifying the user or the device that an "unregistered" control is within operating environment 100. If the key is not within some allowable error range, then manager 102 may inform the added control to become benign such that the added control does not respond to other controls or operating environment 100. The user, device, or operating environment 100 may be prompted that a counterfeit, or unrecognized, control is within operating environment 100.

If manager 102 accepts the added control, then manager 102 retrieves information from the added control's data structure to facilitate communication with other controls, programs and applications within operating environment 100. For example, control 104 may remain passive within operating environment 100. If control 106 desires the functionality of control 104, then control 106 may receive the designation of control 104 from manager 102. Control 106 may store the designation within its own data structure, or may query manager 102 for control 104. Control 104, however, is not "launched" or made active in that it takes over the display or other components of the computing platform.

Figure 2:
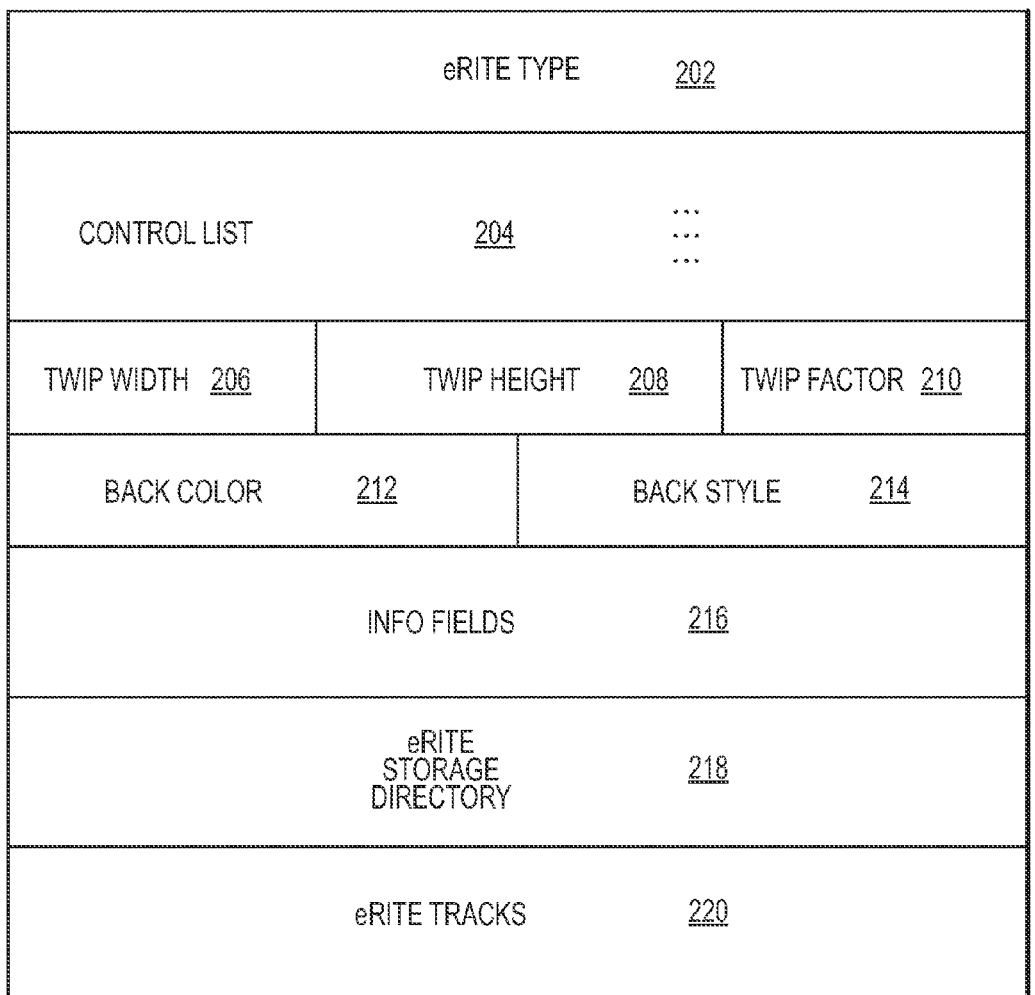
FIG. 2 depicts a block diagram of a data structure for a software control manager in accordance with an embodiment of the present invention.

FIG. 2 depicts a block diagram of a data structure for a software control manager 200 in accordance with an embodiment of the present invention. Manager 200 may be a block of software code that is placed into an operating environment, such as operating environment 100, and executes in that environment. Manager 200 may comprise strings of code and memory location pointer. Specifically, manager 200 is a control with different properties than a typical control. Manager 200 may be known as an e-Reusable Information Technology Environment ("eRITE") control manager. Manager 200 may be stored within memory on a computing platform. Alternatively, manager 200 may be "dropped" into an operating environment by being downloaded into memory on the computing platform. If dropped into an operating environment, manager 200 should be compatible with the operating environment.

Manager 200 may include, but is not limited to, the various properties embodied in its structure. Manager 200 includes an eRITE type string 202 that denotes the overall type of manager 200. Type string 202 identifies manager 200 as a manager control to the operating environment and other controls. Type string 202 may have input and output functionality.

Manager 200 also includes control list 204, which is a comma-separated string that lists the other controls within the operating environment. Alternatively, control list 204 may list controls for use within a specific project. Manager 200 recognizes the controls in control list 204, and coordinates, communicates, and exchanges data with these controls. Control list 204 may be part of the security process for accepting controls by manager 200. Control list 204 may be difficult to change or modify. For example, modifications to control list 204 may involve an elaborate sequence of steps that includes creating a temporary file with an embedded password. The password is used in the call to the property, or control list 204. Control list 204 only may be modified once. Manager 200 may delete the temporary file, and, subsequently display error messages if an attempt is made to view or further modify control list 204. Additional changes may necessitate a repeat of the modification process disclosed above Twip width 206 indicates the width of manager 200 in twips. Twip height 208 indicates the height of manager 200 in twips. Twip factor 210 indicates the value that gives a conversion value into pixels. Pixels may be desired if manager 200 is to be displayed. In a twips-based form, such as visual basic, twip factor 210 may be 15, while in a pixels-based form, twip factor 210 may be 1. Twip width 206, twip height 208, and twip factor 210 may have output functionality. Back color 212 indicates a color value of the background for manager 200. Preferably, the value of back color 212 is given as an RGB value. Back style 214 returns or sets the value for the transparency of the background of manager 200. For example, if back style 214 has a value of 0, then manager 200 may be transparent. If back style 214 has a value of 1, then manager 200 may be opaque. Back color 212 and back style 214 may have input/output functionality.

Information field 216 may be a string that returns or sets the names of the data fields to display in a popup message box within the operating environment. Further, information field 216 may be used to return or set the names of the data fields within a control for information within the operating environment. Storage directory 218 may return or set the name of a storage directory for manager 200. Preferably, the storage directory is located on a "C" drive of the computing platform. Storage directory 218 is a field that is set as soon as manager 200 is created, so that manager 200 is aware of the storage directory location to retrieve information for a particular project. Tracks array 220 is an array of template controls to be used by a control for tracking data in building active tracks within the operating environment. Tracks array 220 may be known as a control array, and may have output functionality.

Manager 200 may include other properties in addition to those disclosed here. The properties may facilitate coordination with the controls within the operating environment. Further, manager 200 may incorporate different properties from the controls themselves. For example, manager 200 may include a pointer array to the various controls.

Referring back to FIG. 1, controls 104, 106, 108, and 110 may have pointers within arrays that point to manager 102. These pointers may be within the data structure of controls 104, 106, 108, and 110. Further, controls within operating environment 100 should be listed in the control list, such as control list 204, of manager 102.

Figure 3:
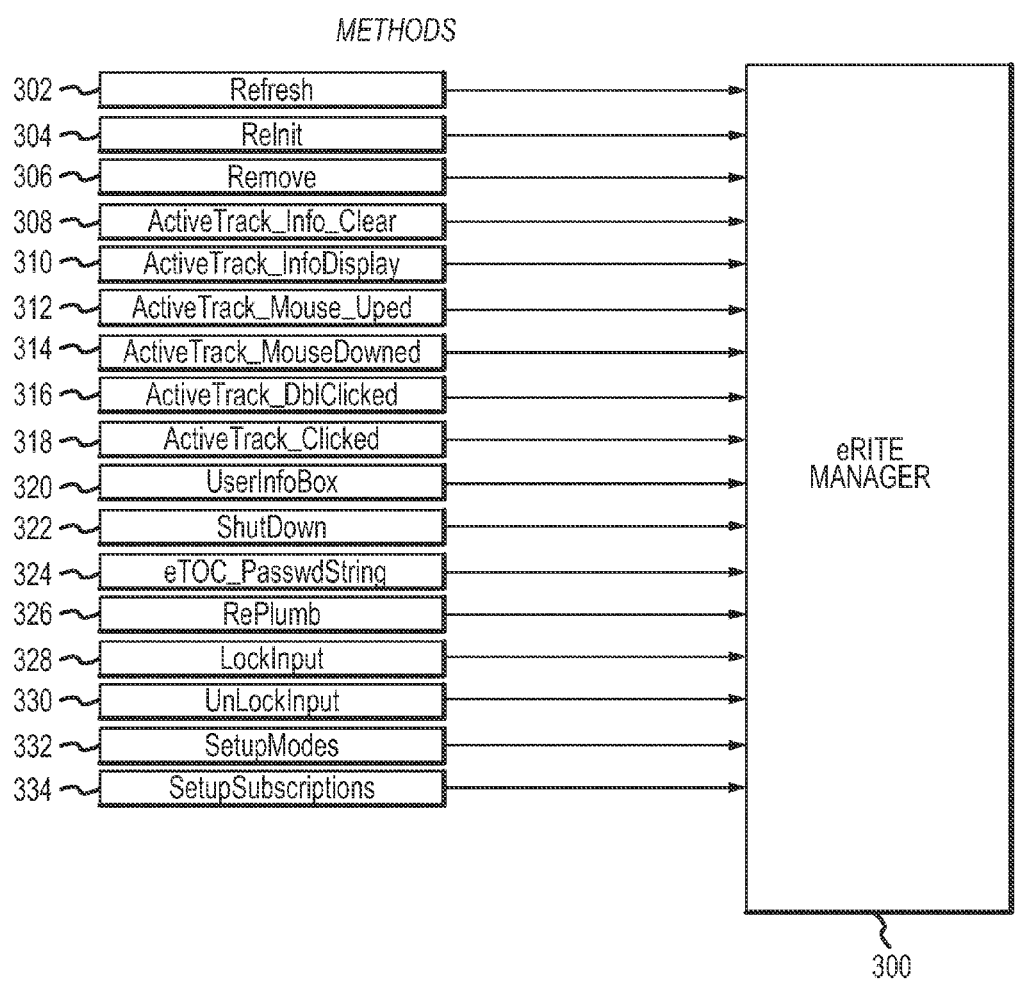
FIG. 3 depicts a block diagram of a software control manager executing within an operating environment in accordance with an embodiment of the present invention.

FIG. 3 depicts a block diagram of a software control manager 300 executing within an operating environment in accordance with an embodiment of the present invention. Manager 300 may receive commands from a user via the operating environment to perform a specific control method or action. In performing the control method or action, manager 300 may use the strings and fields within its data structure to access other components or controls within the operating environment. Specifically, manager 300 may receive commands that initiate the methods or actions disclosed below. Manager 300 then may query or access other controls to complete the method or action. Refresh 302 represents a refresh method that causes any graphical displays on manager 300 to repaint. A refresh method should be used when the display is updated to be current, such as showing a moving target or icon. Reinitialize 304 represents a reinitialize method that causes manager 300 to reset itself to "startup" conditions. Startup conditions may be the state wherein manager 300 has no values within its data structure, or has preset values that are retrieved from memory. For example, all counters may be reset, and graphics and properties are returned to their original state. Alternatively, startup conditions may indicate any condition for manager 300 that is a common default. A reinitialize method may be used when the user of manager 300 changes.

Remove 306 represents a remove method that accepts an argument received at manager 300 as a pointer to a control. Manager 300 removes the control from the control list, such as control list 204. The control list is comprised of the controls recognized by manager 300. Remove 306 may be used when removing a control from the operating environment. Remove 306 prevents other controls from searching for a "connected" control when the control ceases to exist. The following features may pertain to "active tracks," or selected controls within the operating environment. Active track information clear 308 represents a method to clear all the text boxes on an information control. Active track information display 310 represents a method for taking the information about a track having an index passed on as an argument, and placing the track into the corresponding text boxes on an information control.

Active track mouse upped 312 represents a method that closes an information popup message box that is being displayed. Active track mouse upped 312 may be a result of a mouse button being released while the cursor is on an active track icon. Active track mouse downed 314 represents a method that displays a message box or a picture of an object. Active track mouse downed 314 may be a result of a mouse button being pressed while the cursor is on an active track icon. For example, if the right button of the mouse is pressed, the message box may be displayed with all the track's information listed in it. If the left button of the mouse is pressed while the message box is displayed, then a picture relating to an object may be displayed.

Active track double clicked 316 represents a method that centers the active track on the map display and highlights the active track. Further, any track information is placed in an information control. Active track clicked 318 represents a method that highlights the active track. The track information is stored in an information control. Active track clicked 318 may result from a mouse click on an active track icon.

User information box 320 represents a method that displays or removes a message box from the operating environment. For example, if the argument received by manager 300 is not an empty string, then a message box may be displayed with the argument as the message. If the argument received is an empty string, then the message box may be removed. Shutdown 322 represents a method that is a feature of the security process for manager 300 and the operating environment. When shutdown 322 is invoked, the method may disable the project or operating environment. In order to resume, the program or computing platform may have to be restarted. Shutdown 322 may be used in conjunction with a timer and a user identification/password dialog to prevent an unattended unit, device or computing platform from being used by unauthorized personnel.

Password string 324 represents a method that is another feature of the security process for manager 300 and the operating environment. Password string 324 reads a special temporary file and retrieves a password from the file. The method then deletes the file. If password string 324 is invoked without the special file available, then the method will generate an error to manager 300. Replumb 326 represents a method that tells manager 300 to search through the controls in the operating environment, or, alternatively, within a project, and identify all the controls compatible with manager 300. Preferably, these controls are eRITE controls, as disclosed above. After identification, then the method will couple the controls together according to data strings within the controls.

Lock input 328 represents a method that temporarily disables any user input to the operating environment, or, alternatively, to a project. Lock input 328 may be invoked when a request for data is generated. During the period to transmit and receive the data, the project, or operating environment, should be disabled to prevent multiple clicks on the same button. Lock input 328 may be useful if manager 300 or the operating environment is awaiting data from a remote source, such as a wireless transmitter. Unlock input 330 represents a method that enables an input to be received into the project, or the operating environment. Unlock input 330 may override lock input 328.

Setup mode 332 represents a method that reads a text file in a storage directory and the sets a mode control within the operating environment. Preferably, setup mode 332 may set the buttons on a mode control. Setup subscription 334 represents a method that is used when changing modes to ensure that the subscription controls are appropriate for the mode selected. For example, hostile or friendly filters may be set for a battlefield scenario, or progress bars for a timed scenario.

Additional commands to execute additional methods may be received by manager 300. Further, manager 300 may perform any methods related to its function of coordinating, validating, and communicating to controls within the operating environment. Manager 300 may access other controls and their properties in completing the methods disclosed above. Moreover, manager 300 may access any component, program, feature, data, protocol, application, and the like within the operating environment or on the computing platform in completing the disclosed methods.

Figure 4:
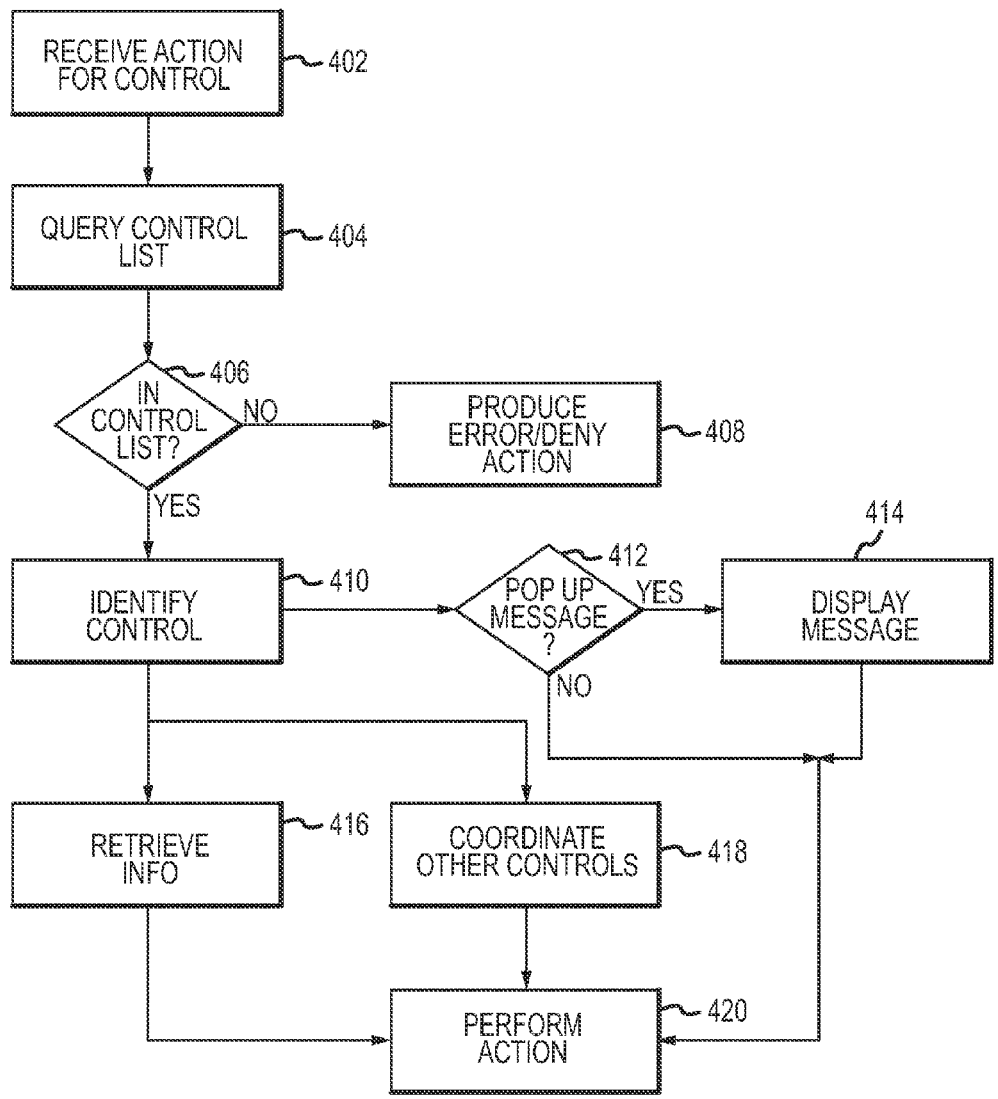
FIG. 4 depicts a flowchart for performing actions using a software control manager of software controls in accordance with an embodiment of the present invention.

FIG. 4 depicts a flowchart for performing actions using a software control manager in accordance with an embodiment of the present invention. Actions may include requests for data, processing data received, retrieving data for an application, accessing data within a memory, executing a program or application, and the like. For example, a received action may be overlaying received data onto a graphic, such as a map, on a PDA. Preferably, actions are performed using controls that receive, compute, retrieve, or access data, either from a user or memory. The data then may be utilized by an executing program or application.

Step 402 executes by receiving an action for at least one control within the operating environment. The request for the action may be received at the software control manager of the controls, such as manager 102 in FIG. 1. The manager responds to the action by coordinating the steps disclosed below with the controls and the operating environment. Step 404 executes by querying the control list within the manager. The control list includes the controls registered by the manager as authorized by the manager to reside within the operating environment, or have access to a specific project supporting the action.

Step 406 executes by determining whether the control is within the control list of the manager. If no, then step 408 executes by producing an error to the manager, operating environment, or the display. Further, the manager may deny the action from performing within the operating environment. The action should not be performed.

Step 410 executes by identifying the control or controls to perform the action. For example, if the action is to update a map graphic displayed on the computing device, then a map control, a compass control, and the like may be identified as desired in updating the map graphic. Step 412 executes by determining whether a popup message is to be used in resolving the action. A message may be displayed using the commands and methods disclosed above with reference to FIG. 3. If yes, then step 414 executes by displaying the message in coordination with the manager.

Step 416 executes by retrieving the information desired in completing the action. The information may be data stored in a memory, or data or data packet received from another device or location. Further, the information may be input by a user of the computing platform, and elicited by a prompt, display, or message within the operating environment. Thus, the information to complete the action may be retrieved according to any process, method, or application known to one skilled in the art. Step 418 executes by coordinating the action with the controls using the manager within the operating environment. The controls may have data structures and configurations to allow them to communicate directly with each other, but the manager still may be used to facilitate the communication by authorizing the controls and accessing memory or other components of the computing platform. Step 420 executes by performing the action using the controls identified by the manager and the retrieved information. Steps 412-414, 416, and 418 may be executed simultaneously, or in any order desired. These steps may not be dependent upon each other. Alternatively, the steps may be executed in a different order than that disclosed.

Figure 5:
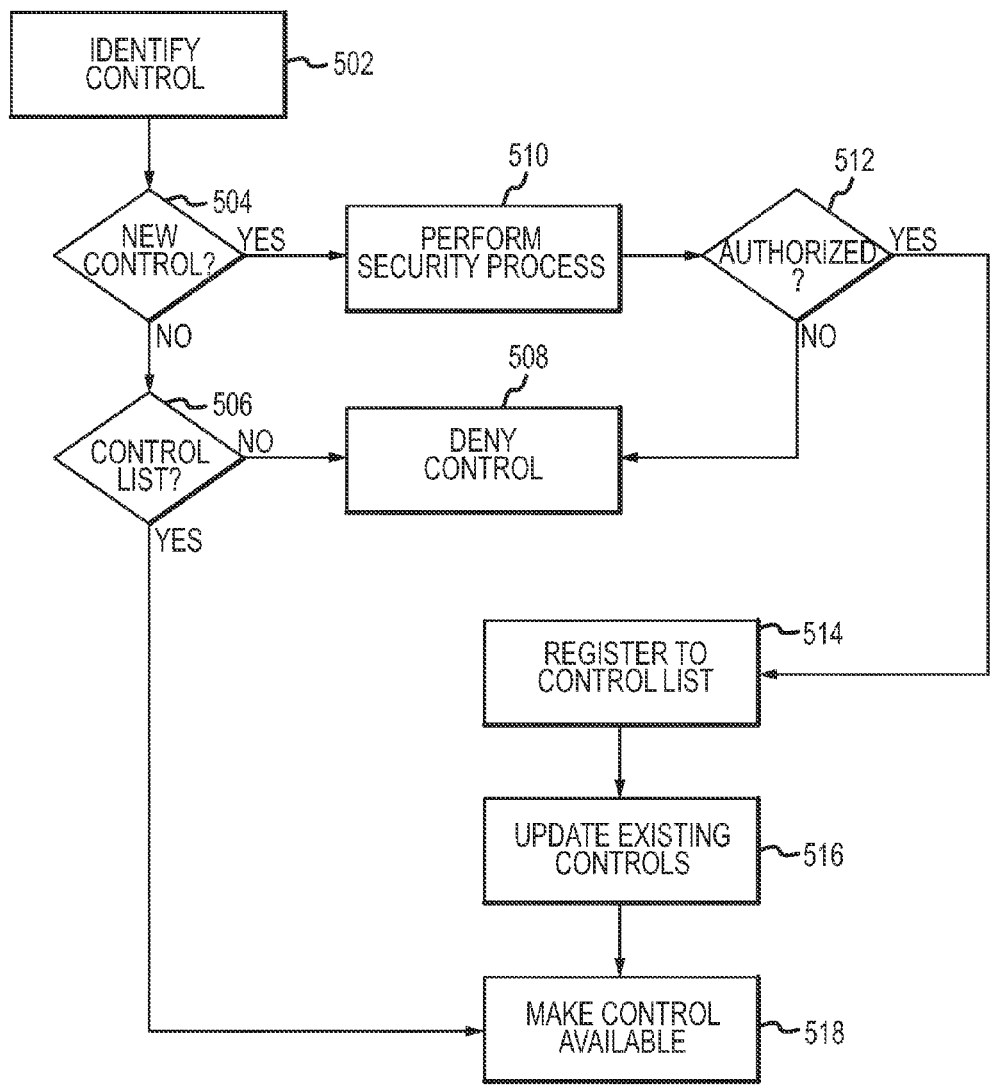
FIG. 5 depicts a flowchart for coordinating a control using a software control manager in accordance with an embodiment of the present invention.

FIG. 5 depicts a flowchart for coordinating a control using a software control manager in accordance with an embodiment of the present invention. The manager may coordinate access and authorization for existing and new controls within the operating environment. The manager should be aware of all the controls enabled within the operating environment, or any new controls added by downloading the new controls or receiving the new controls from a remote location. If the manager is not aware of a control, or does not authorize the control, then the control's functionality may be limited or denied within the operating environment.

Step 502 executes by identifying a control within the operating environment that is not recognized by the manager. Preferably, the manager does not list the identified control within its control list. Step 504 executes by determining whether the identified control is new. The identified control may be new in that is has been added to the operating environment from another source, such as remote device, or stored within memory. Alternatively, the identified controls may have been dormant for a specified period. The manager may have stopped any actions with the control due to inactivity. If step 504 is no, then step 506 executes by determining whether the identified controls is listed within the control list of the manager. If yes, then step 518 executes by making the control available to the manager and other controls within the operating environment. If no, then step 508 executes by denying the control. The control may be denied by limiting its functionality within the operating environment. Alternatively, the control may be shutdown or denied any access to other controls within the operating environment. Further, the control may be deleted if the manager does not recognize the control.

If step 504 is yes, then step 510 executes by performing a security process using the manager to authorize the new control. The security process may be executed as follows. The manager may send a string to the new control. The string may be data generated by the manager. The control modifies or adds to the data string and forwards the data string back to the manager. If the modified data string matches the string looked for by the manager, then the control is authorized for the operating environment. Thus, step 512 executes by determining whether the new control is authorized. If yes, then step 514 executes by registering the new control to the control list of the manager. The new control may be registered by being added to the control list. If no, then step 508 executes by denying the new control authorization within the operating environment.

Step 516 executes by updating existing controls with the information for the registered new controls. The information for the updates may be received from the manager. This step is disclosed in greater detail with reference to FIG. 6. Step 518 executes by making the control available to the manager, other controls, and the like.

Figure 6:
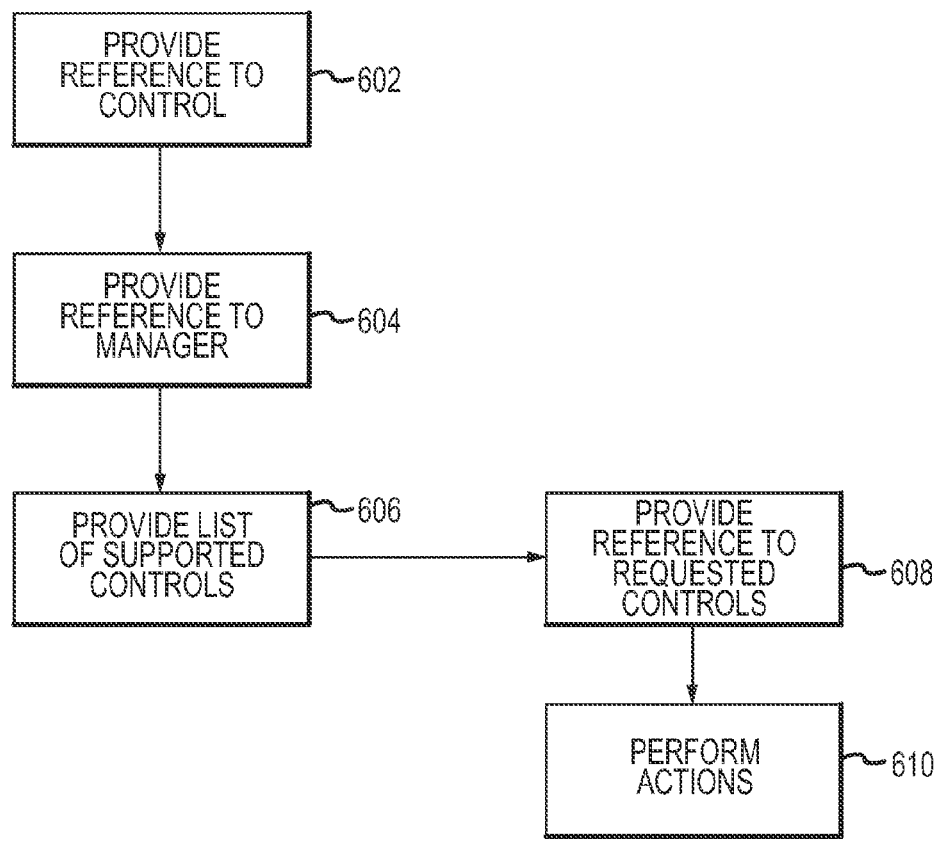
FIG. 6 depicts a flowchart for incorporating a new control with a software control manager in accordance with an embodiment of the present invention.

FIG. 6 depicts a flowchart for incorporating a new control with a software control manager in accordance with an embodiment of the present invention. FIG. 6 may correspond to step 516 in FIG. 5, though step 516 is not limited by the disclosed embodiments of FIG. 6. Further, FIG. 6 is not limited by step 516 or the disclosed embodiments of FIG. 5.

The steps executed with reference to FIG. 6 should occur after a new control has been validated by a security process and registered by the manager, and the control is ready for introduction to the operating environment and the other controls. The disclosed steps, however, may occur whenever appropriate.

Step 602 executes by providing a reference to the control. The manager tells the control how to reference itself as the other controls may identify the control within the operating environment. The control, from within itself, may not adjust it's position, but other controls may move the control as they see the control differently. The reference allows the controls to treat itself as "another" control. The manager provides the reference so the control may perform the same actions on itself that other controls may perform.

Step 604 executes by providing a reference to the control for the manager. The manager tells the control how to reference the manager in order to receive data from the manager and to send data to the manager. Step 606 executes by providing a list, as a file or data string, from the control to the manager of the other controls that are supported by the control. The supported controls are those controls that the control may communicate. The controls may have a list of support members that is a comma-separated string of control names, as recognized by the manager. The string lists the controls for communication with the new control. For example, a compass control may need to be aware of a map control, or a tree control may need to be aware of a data control. The list of supported controls is given to the manager to process and store.

Step 608 executes by providing references to requested controls. The references to requested controls are provided to the new control from the manager, as long as the requested controls exist. The requested controls may correlate to the list of supported controls disclosed above. As each control is added, the control is added to the control list of the manager. When a control's support members string contains the name of a control in the control list, then a reference to that control is provided for the new, or requesting, control. If a control has an entry in the support members string that does not exist in the control list, then the new control may ignore any calls or uses of the non-existing control. For example, a map control may desire to use a macro control as a support member. If the map control is added and the macro control does not exist, then any use of the macro control from within the map control may be ignored. Step 610 executes by performing actions using the new control and the manager.

It will be apparent to those skilled in the art that various modifications can be made in the present invention without departing from the spirit or scope of the invention. Thus, it is intended that the disclosed embodiments cover the modifications and variations of this invention provided that they come within the scope of the following claims and their equivalents.

What is claimed is:

1. An operating environment for a computing platform having at least one control, wherein said computing platform includes a processor and a memory, comprising:
    a first control and a second control to provide functions, wherein the first control comprises a map control providing the function of displaying a map on a display of the computing platform;
    a manager that identifies said first control or second control and coordinates information with said first control or second control, wherein said functions use said information, and wherein said manager coordinates said first or second control; and
    a plurality of commands receivable by said manager from a user of the computing platform via said operating environment, each said command initiating performance by said manager of a corresponding one of a plurality of actions represented by said command, said plurality of actions including actions pertaining to active tracks within the operating environment, wherein said commands include:
        an active track information clear command representing an action that clears all text boxes on an information control,
        an active track information display command representing an action that takes information about a track having an index passed on as an argument and places the track into a corresponding text box on an information control,
        an active track mouse upped command representing an action that closes an information popup message box being displayed,
        an active track mouse downed command representing an action that displays a message box or a picture of an object,
        an active track double clicked command representing an action that centers the active track on the map display and highlights the active track, and
        an active track clicked command representing an action that highlights the active track.

2. The operating environment of claim 1, further comprising a control list within said manager, wherein said control list references said first control and said second control.

3. The operating environment of claim 2, wherein said manager forwards said control list to said first control.

4. The operating environment of claim 1, wherein said manager includes a control list, wherein said control list references said at least one control.

5. The operating environment of claim 1, further comprising an application that executes in conjunction with said function.

6. The operating environment of claim 1, wherein said manager retrieves data structure information from said first control.

7. A computing platform having an operating environment comprising a self-executable control manager that identifies a plurality of controls within said operating environment on said computing platform, wherein said plurality of controls manipulate graphical data stored in a memory coupled to a processor on said computing platform and provides the function of displaying a map on a display of the computing platform, wherein the plurality of controls manipulate stored data and associate received data with the stored data, and wherein said manager receives at least one command from a user of the computing platform via said operating environment, said at least one command initiating performance by said manager of at least one of a plurality of actions, wherein said plurality of actions include:
    an action that causes any graphical displays on said manager to repaint;
    an action that causes said manager to reset itself to startup conditions;
    an action that removes a control from a control list within said manager;
    an action that clears all text boxes on an information control;
    an action that takes information about a track having an index passed on as an argument and places the track into a corresponding text box on an information control;
    an action that closes an information popup message box being displayed;
    an action that displays a message box or a picture of an object;
    an action that centers an active track on the map display and highlights the active track; and
    an action that highlights an active track.

8. A method for managing controls within an operating environment using a software control manager, wherein said operating environment facilitates data exchange, comprising:
    identifying controls within said operating environment that are not recognized by said manager;
    determining whether said identified controls are new to the operating environment, wherein a control is considered new if said control has been added to said operating environment or said control has been dormant within said operating environment for a specified period of time, said identified controls determined to be new comprising new controls;
    performing a security process using said manager to determine whether said new controls are authorized;
    registering with said manager said new controls authorized by said manager in accordance with said security process, wherein said new controls authorized by said manager are registered by adding said authorized new controls to a control list within said manager;
    providing information to said registered controls from said manager;
    facilitating communication between said controls and said operating environment via said manager;
    determining whether said identified controls that are not new to said operating environment are listed within said control list;
    denying said identified controls authorization within the operating environment that are determined to be unauthorized in accordance with the security process or that are determined to not be on said control list; and
    making said identified controls that are determined to be within said control list or are registered with said manager in said registering step available to at least said manager and other controls.

9. The method of claim 8, wherein said providing information includes initializing pointers within said registered controls.

10. The method of claim 8, wherein said providing includes providing a list of supported controls from said manager.

11. The method of claim 8, wherein said providing includes providing a reference to said manager.

12. A method for performing actions with controls within an operating environment, comprising:

receiving one of a plurality of commands for said actions at a manager within said operating environment, wherein said manager coordinates said controls, wherein one of the controls comprises a map control providing the function of displaying maps on a display, and wherein said command is associated with at least one of a plurality of actions represented by each said command, said plurality of actions including actions pertaining to active tracks within the operating environment, wherein said commands include:

an active track information clear command representing an action that clears all text boxes on an information control, an active track information display command representing an action that takes information about a track having an index passed on as an argument and places the track into a corresponding text box on an information control, an active track mouse upped command representing an action that closes an information popup message box being displayed, an active track mouse downed command representing an action that displays a message box or a picture of an object, an active track double clicked command representing an action that centers the active track on the map display and highlights the active track, and an active track clicked command representing an action that highlights the active track;

identifying a control method for said action, wherein said manager initiates said control method;

identifying at least one control to execute in conjunction with said control method;

receiving information from said manager at said at least one control; and performing said action using said information with said at least one control.

\* \* \* \* \*